(12) United States Patent
Wilson

(10) Patent No.: US 8,147,684 B2
(45) Date of Patent: Apr. 3, 2012

(54) APPARATUS AND METHODS FOR LUBRICANT FILTRATION AND DRUM PUMP FILTRATION SYSTEM

(75) Inventor: Jay Wilson, Helenville, WI (US)

(73) Assignee: Trico Corporation, Pewaukee, WI (US)

( * ) Notice: Subject to any disclaimer, the term of this patent is extended or adjusted under 35 U.S.C. 154(b) by 206 days.

(21) Appl. No.: 12/661,807

(22) Filed: Mar. 24, 2010

(65) Prior Publication Data

US 2010/0264071 A1   Oct. 21, 2010

Related U.S. Application Data

(60) Provisional application No. 61/211,288, filed on Mar. 27, 2009.

(51) Int. Cl.
  *B01D 29/88* (2006.01)
  *B01D 35/02* (2006.01)
(52) U.S. Cl. ....... 210/90; 210/416.5; 210/435; 210/470; 210/241; 184/6.24; 222/189.11
(58) Field of Classification Search ............ 210/90, 210/416.5, 455, 435, 473, 474, 238, 470, 210/241; 123/196 A; 184/6.24; 222/189.06, 222/189.11
See application file for complete search history.

(56) References Cited

U.S. PATENT DOCUMENTS

| | | | |
|---|---|---|---|
| 126,624 A | 5/1872 | Coffee | |
| 539,117 A | 5/1895 | Busch | |
| 779,357 A | 1/1905 | Gardner | |
| 805,645 A | 11/1905 | Guillott | |
| 992,503 A | 5/1911 | Howard | |
| 1,113,276 A | 10/1914 | Woodmansee | |
| 1,571,495 A | 2/1926 | Smith | |
| 1,600,262 A | 9/1926 | Wickham | |
| 1,610,283 A | 12/1926 | Hill | |
| 1,687,395 A | 10/1928 | Shew | |
| 1,688,279 A | 10/1928 | Locke | |
| 1,864,195 A | 6/1932 | Hall | |
| 2,227,646 A | 1/1941 | Hillman | |
| 2,335,557 A | 11/1943 | Winther | |
| 2,340,455 A | 2/1944 | Davis | |
| 2,376,623 A | 5/1945 | Romberg | |
| 2,397,597 A | 4/1946 | Dunkle | |
| 2,439,709 A | 4/1948 | Ashbury | |
| 2,589,081 A | 3/1952 | Hertz | |
| 2,608,993 A | 9/1952 | Andrews | |
| 2,703,628 A | 3/1955 | Pompeo et al. | |
| 2,774,621 A | 12/1956 | Kilbourne, Jr. | |

(Continued)

FOREIGN PATENT DOCUMENTS

CA    2291763    7/2002

(Continued)

OTHER PUBLICATIONS

International Search Report, dated Jan. 20, 1999 for PCT/US98/09039, International Filing Date May 8, 1998.

(Continued)

*Primary Examiner* — Terry Cecil

(74) *Attorney, Agent, or Firm* — Ryan Kromholz & Manion, S.C.

(57) ABSTRACT

A lubricant filtration assembly is provided for quick attachment with a lubricant reservoir, for pre-filtering lubricant and pumping the lubricant into its intended machinery.

1 Claim, 3 Drawing Sheets

U.S. PATENT DOCUMENTS

| | | | |
|---|---|---|---|
| 2,930,432 | A | 3/1960 | Engstrom |
| 2,950,943 | A | 8/1960 | Forrest |
| 2,995,213 | A | 8/1961 | Gross |
| 3,123,095 | A | 3/1964 | Kohler |
| 3,193,990 | A | 7/1965 | Smith |
| 3,233,173 | A | 2/1966 | Lees et al. |
| D205,166 | S | 6/1966 | Price |
| 3,323,291 | A | 6/1967 | Kern |
| 3,338,262 | A | 8/1967 | Chopelin |
| 3,447,562 | A | 6/1969 | Hoffman |
| D217,665 | S | 5/1970 | Self |
| D217,666 | S | 5/1970 | Self |
| D217,667 | S | 5/1970 | Self |
| 3,952,566 | A | 4/1976 | Jacobson |
| 4,018,579 | A | 4/1977 | Hoffmann |
| 4,047,814 | A | 9/1977 | Westcott |
| 4,058,766 | A | 11/1977 | Vogel et al. |
| 4,064,455 | A | 12/1977 | Hopkins et al. |
| 4,105,092 | A | 8/1978 | Zeidler et al. |
| 4,227,419 | A | 10/1980 | Park |
| 4,312,424 | A | 1/1982 | Taylor et al. |
| 4,345,668 | A | 8/1982 | Gaunt |
| 4,423,371 | A | 12/1983 | Senturia et al. |
| 4,445,168 | A | 4/1984 | Petryszyn |
| 4,466,508 | A | 8/1984 | Busch |
| 4,503,383 | A | 3/1985 | Agar et al. |
| D279,549 | S | 7/1985 | Elmburg |
| 4,527,661 | A | 7/1985 | Johnstone et al. |
| 4,591,024 | A | 5/1986 | Erickson |
| 4,591,434 | A * | 5/1986 | Prudhomme ............... 210/117 |
| 4,629,334 | A | 12/1986 | Hochstein |
| 4,646,070 | A | 2/1987 | Yasuhara |
| 4,681,189 | A | 7/1987 | Krisiloff |
| 4,689,553 | A | 8/1987 | Haddox |
| 4,733,556 | A | 3/1988 | Meitzler et al. |
| 4,735,286 | A | 4/1988 | Miki et al. |
| 4,738,336 | A | 4/1988 | Smith et al. |
| 4,990,057 | A | 2/1991 | Rollins |
| 5,025,222 | A | 6/1991 | Scott et al. |
| 5,035,811 | A * | 7/1991 | Grondin et al. ............ 210/806 |
| 5,039,425 | A | 8/1991 | Caris et al. |
| 5,045,798 | A | 9/1991 | Hendrick |
| 5,060,760 | A | 10/1991 | Long et al. |
| 5,071,527 | A | 12/1991 | Kauffman |
| 5,072,190 | A | 12/1991 | Martin |
| 5,080,195 | A | 1/1992 | Mizumoto et al. |
| 5,101,936 | A | 4/1992 | Paredes et al. |
| 5,103,181 | A | 4/1992 | Gaisford et al. |
| 5,125,480 | A | 6/1992 | Gregory et al. |
| D333,177 | S | 2/1993 | Poirier |
| 5,196,898 | A | 3/1993 | Tamura et al. |
| 5,197,569 | A | 3/1993 | Roessler et al. |
| 5,200,027 | A | 4/1993 | Lee et al. |
| 5,203,680 | A | 4/1993 | Waldrop |
| D336,509 | S | 6/1993 | Safford et al. |
| D336,679 | S | 6/1993 | Safford et al. |
| 5,224,051 | A | 6/1993 | Johnson |
| D338,158 | S | 8/1993 | Poirier |
| 5,249,455 | A | 10/1993 | Cox |
| 5,260,665 | A | 11/1993 | Goldberg et al. |
| 5,262,732 | A | 11/1993 | Dickert et al. |
| 5,269,175 | A | 12/1993 | Chmiel et al. |
| 5,271,528 | A | 12/1993 | Chien |
| 5,273,134 | A | 12/1993 | Hegemier et al. |
| 5,274,335 | A | 12/1993 | Wang et al. |
| 5,314,613 | A | 5/1994 | Russo |
| 5,317,252 | A | 5/1994 | Kranbuehl |
| 5,318,152 | A | 6/1994 | Ehlert |
| 5,328,275 | A | 7/1994 | Winn et al. |
| 5,330,636 | A | 7/1994 | Reichert |
| 5,332,064 | A | 7/1994 | Liu |
| 5,334,941 | A | 8/1994 | King |
| 5,381,874 | A | 1/1995 | Hadank et al. |
| 5,382,942 | A | 1/1995 | Raffa et al. |
| D358,097 | S | 5/1995 | Leibowitz |
| D358,548 | S | 5/1995 | Platte |
| 5,457,396 | A | 10/1995 | Mori et al. |
| 5,499,902 | A | 3/1996 | Rockwood |
| 5,504,573 | A | 4/1996 | Cheiky-Zelina |
| 5,521,515 | A | 5/1996 | Campbell |
| 5,540,086 | A | 7/1996 | Park et al. |
| 5,542,499 | A | 8/1996 | Westermeyer |
| 5,548,217 | A | 8/1996 | Gibson et al. |
| 5,568,842 | A | 10/1996 | Otani |
| 5,596,266 | A | 1/1997 | Mori et al. |
| 5,604,441 | A | 2/1997 | Freese |
| 5,614,830 | A | 3/1997 | Dickert et al. |
| 5,634,531 | A | 6/1997 | Graf et al. |
| 5,647,735 | A | 7/1997 | Rockwood |
| 5,656,767 | A | 8/1997 | Garvey, III et al. |
| 5,671,825 | A | 9/1997 | Wong et al. |
| 5,674,401 | A | 10/1997 | Dickert et al. |
| 5,702,592 | A | 12/1997 | Suri et al. |
| 5,754,055 | A | 5/1998 | McAdoo |
| 5,779,005 | A | 7/1998 | Jones, Jr. et al. |
| 5,789,665 | A | 8/1998 | Voelker et al. |
| 5,806,630 | A | 9/1998 | Bernal |
| 5,816,212 | A | 10/1998 | Lindquist et al. |
| 5,824,889 | A | 10/1998 | Park et al. |
| 5,826,986 | A | 10/1998 | Adkins et al. |
| 5,858,070 | A | 1/1999 | Halm et al. |
| 5,878,842 | A | 3/1999 | Rake |
| 5,884,802 | A | 3/1999 | Leibowitz |
| 6,028,433 | A | 2/2000 | Cheiky-Zelina et al. |
| 6,077,330 | A | 6/2000 | Sabelstrom |
| 6,113,676 | A | 9/2000 | Kumpulainen |
| 6,192,025 | B1 | 2/2001 | Chen |
| 6,204,656 | B1 | 3/2001 | Cheiky-Zelina et al. |
| 6,223,589 | B1 | 5/2001 | Dickert et al. |
| 6,250,152 | B1 | 6/2001 | Klein et al. |
| 6,253,601 | B1 | 7/2001 | Wang et al. |
| 6,273,031 | B1 | 8/2001 | Verdegan et al. |
| 6,277,173 | B1 | 8/2001 | Sadakata et al. |
| 6,278,282 | B1 | 8/2001 | Marszalek |
| 6,368,411 | B2 | 4/2002 | Roberson, Jr. et al. |
| 6,443,006 | B1 | 9/2002 | Degrave |
| 6,447,573 | B1 | 9/2002 | Rake |
| 6,449,580 | B1 | 9/2002 | Bardetsky et al. |
| 6,459,995 | B1 | 10/2002 | Collister |
| 6,460,656 | B1 | 10/2002 | Jones, Jr. et al. |
| 6,509,749 | B1 | 1/2003 | Buelna et al. |
| 6,513,368 | B2 | 2/2003 | Bondarowicz et al. |
| 6,519,034 | B1 | 2/2003 | Engler et al. |
| 6,535,001 | B1 | 3/2003 | Wang |
| 6,551,055 | B2 | 4/2003 | Rockwood |
| 6,553,812 | B2 | 4/2003 | Park et al. |
| 6,557,396 | B2 | 5/2003 | Ismail et al. |
| 6,564,126 | B1 | 5/2003 | Lin et al. |
| 6,568,919 | B1 | 5/2003 | Fletcher et al. |
| D485,189 | S | 1/2004 | Montalbano et al. |
| 6,851,676 | B2 | 2/2005 | Martins et al. |
| 6,932,856 | B2 | 8/2005 | Rake |
| 7,017,712 | B1 | 3/2006 | Rake et al. |
| D527,639 | S | 9/2006 | Voss et al. |
| D528,425 | S | 9/2006 | Van Dorin et al. |
| 7,140,468 | B2 | 11/2006 | Rake et al. |
| D573,885 | S | 7/2008 | Considine et al. |
| D589,597 | S | 3/2009 | Bloch et al. |
| D589,807 | S | 4/2009 | Gundrum et al. |
| D589,808 | S | 4/2009 | Gundrum et al. |
| D589,809 | S | 4/2009 | Gundrum et al. |
| 7,541,004 | B2 | 6/2009 | Niksa et al. |
| 7,846,342 | B2 * | 12/2010 | Johnson et al. ............ 210/774 |
| 7,993,530 | B2 * | 8/2011 | Horne ........................ 210/767 |

FOREIGN PATENT DOCUMENTS

| | | |
|---|---|---|
| CA | 2289726 | 3/2003 |
| CA | 122622 | 4/2009 |
| CA | 127725 | 5/2009 |
| CA | 127726 | 5/2009 |
| CA | 1271724 | 5/2009 |
| DE | 37325 | 3/1968 |
| GB | 121092 | 12/1918 |
| JP | 2-308916 | 12/1990 |
| JP | 411132304 | 5/1999 |

OTHER PUBLICATIONS

Iotech Catalog, p. 65, Jan. 1995.

"Model 958PF On-Line Ferrograph", *Foxboro Analytical*, (no month available) 1980, 4 pgs.

958F Series On-Line Ferrograph Installation and Operation, The Foxboro Company, (no. month available) 1980, 6 pgs.

"Journal Reprints", The British Institute of Non-Destructive Testing, M.H. Jones and A.R. Massoudi, Insight, vol. 37 No. 8, Aug. 1995. pp. 606-610.

"Basics of Measuring the Dielectric Properties of Materials", Hewlett Packard, (no month available) 1992, No. 1217-1.

"The Nist 60-Millimeter Diameter Cylindrical Cavity Resonator: Performance Evaluation for Permittivity Measurements", Eric J. Vanzura, Richard G. Geyer and Michael D. Janezic, Aug. 1993, National Institute of Standards and Technology Technical Note.

Measuring Moisture in Liquids; A New Method, *Sensors*, Dec. 1996 pp. 42-47.

Sensor Mediated in Situ Measurement of Moisture in Organic Liquids, Phys-Chem Scientific Corp. sales literature, date unknown.

"Hydraulic and Lubrication Systems Solutions: Water Sensor—An Essential tool for fluid condition monitoring" Pall Corporation sales literature, date unknown.

Environmental Solutions for the Military: Pall Portable Fluid Purifier, not dated; Pall Corporation web site address: www.pall.com/environ/miltary/solutions/products/purifier.html.

Pall Water Sendor: An essential tool for fluid condition monitoring; Pall Corporation sales literature, date unknown.

"Advancement of PREDICT/DLI Industrial Sensors", M.A. Cheiky-Zelina, R.W. Brown and D.E. Schuele, Department of Physics, Case Western Reserve University, Mar. 1997.

Filtration Products, Solutions for Tomorrow's Challenges, Trico sales literature, 7 pages, date unknown.

Mobile Filtration System, Oil Service Products sales literature, 1 page, date unknown.

Mobile Filtration Systems, Schroeder Industries LLC, 2 pages, date unknown.

* cited by examiner

APPARATUS AND METHODS FOR LUBRICANT FILTRATION AND DRUM PUMP FILTRATION SYSTEM

RELATED APPLICATION

This application claims the benefit of provisional patent application Ser. No. 61/211,288, filed 27 Mar. 2009.

BACKGROUND OF THE INVENTION

Lubrication is an important aspect of maintaining machinery in proper operating condition. Machine elements such as bearings, journals, shafts, and joints require proper lubrication between their moving surfaces to decrease friction, prevent contamination, reduce wear and dissipate heat. Improper lubrication is likely to lead to premature component wear and component or system failure.

When determining the optimal lubrication between moving machine elements, many factors should be considered. These factors include the mode of operation of the machine, the type of machine element to be lubricated, the environment of the machine, the operating speed of the machine, the lubricant's viscosity, the lubricant's temperature, the lubricant's ingredients, and the lubricant's condition.

It is particularly desirable to provide lubricant delivery to a machine element relatively free of sediment, debris, or other foreign material that could have damaging effects on the machine element.

SUMMARY OF THE INVENTION

The present invention provides an oil filter for filtering oil after being pumped from a reservoir, such as a 50-gallon drum. The oil filter can be coupled to the outside of the drum and coupled to a drum pump, with a bracket being provided to couple the filter with a bung-engaging pathway for lubricant to be removed from the drum, filtered, and provided to the intended piece of machinery.

Lubricant stored in drums prior to use is not necessarily contaminant-free, and the present invention is provided with a filtration system to filter lubricant during removal from its storage container.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention.

Figure 1:
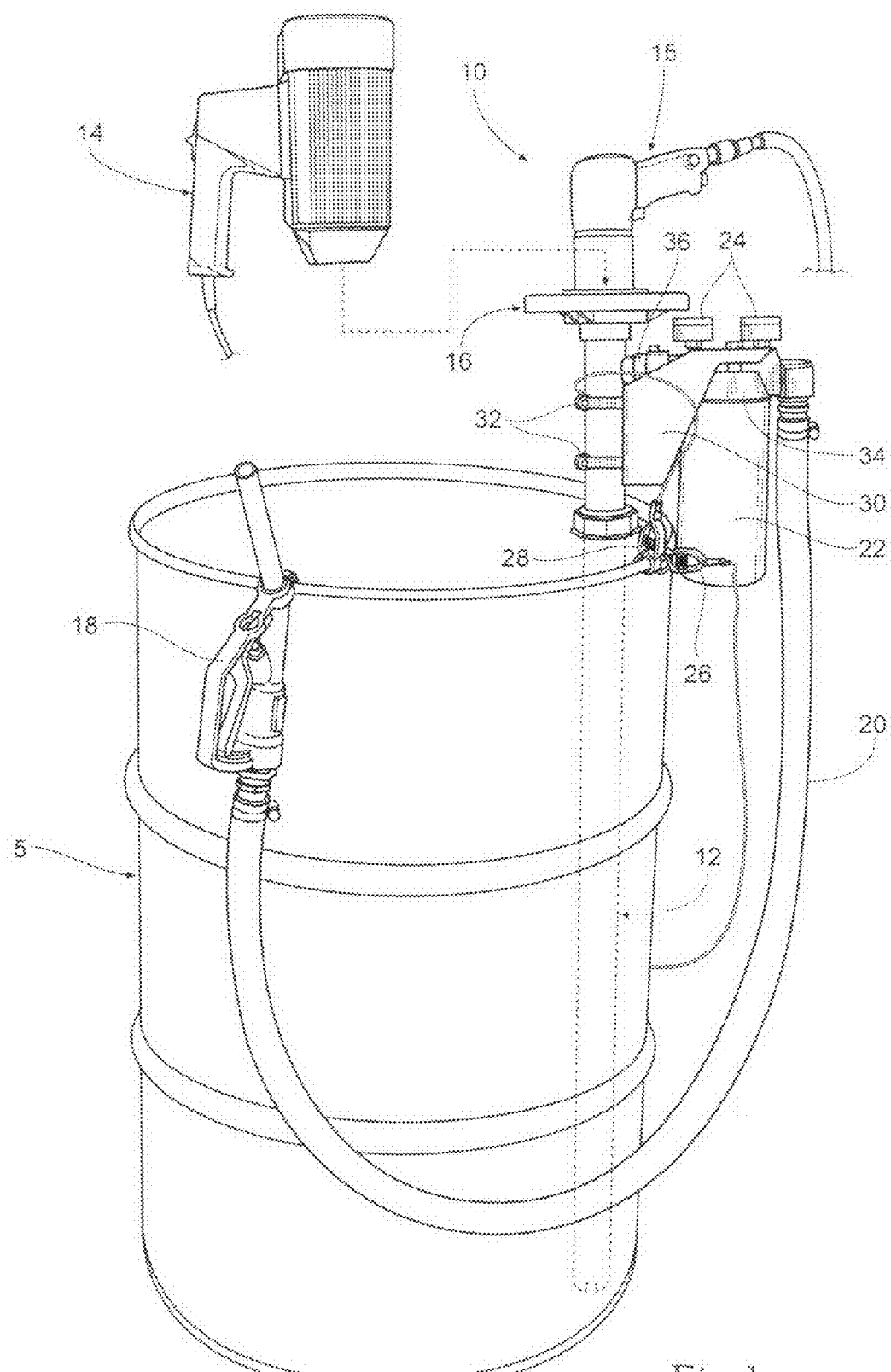
FIG. 1 is a perspective view of a lubricant filtration system of the present invention.

Referring now to FIG. 1, a perspective view of a lubricant filtration system 10 of the present invention is shown. The lubricant filtration system 10 is used to remove lubricant from drum 5, filter the lubricant with filter 22, and dispense the lubricant through dispensing handle 18.

One aspect of the invention is that the lubricant filtration system 10 can be removed from drums 5 and replaced onto new drums. Ordinarily it has been thought by end users that lubricant stored in drums prior to use is contaminant-free. However, it is now been learned that it is beneficial to filter lubricant even prior to its use by filtering the lubricant from its original container, as the original container can impart impurities to the lubricant prior to its first use.

Lubricant intake 12 is coupled to the drum 5 at an opening, and through which lubricant is removed from drum 5 by either an electrical pump 14, preferably a centrifugally operated pump, by pneumatic unit 15 if air driven pumps are available, or any other type of pumping mechanism. Lubricant intake 12 is coupled externally to the drum 5 with a hand wheel 16, which has a threaded coupling for allowing easily the switching of different types of pumps, for instance electrical unit 14 can be unthreaded and switched with a pneumatic unit 15.

From the lubricant intake 12, the lubricant is withdrawn from the drum 5 and transferred via pipe 36 into filter unit 22 by using adapter 36 and filter head 34. The filter unit 22 is preferably coupled to the lubricant intake 12 by bracket 30, held by clamps 32, and adapter 36. Lubricant is forced through filter unit 22 into discharge pipe 20, ultimately to hand dispenser 18 so that the filtered lubricant can be dispensed.

The unit is preferably grounded through grounding wires and couplings 26 and 28, grounding both the pump 14/15/barrel 5 and then the barrel 5 to ground.

In a preferred embodiment, filter element(s) 22 are coupled directly to a drum pump 14 as a direct means of filtration. Although motor driven drum pumps 14 are shown, any pump type, such as piston pumps, or direct motor driven pumps could be employed.

Figure 2:
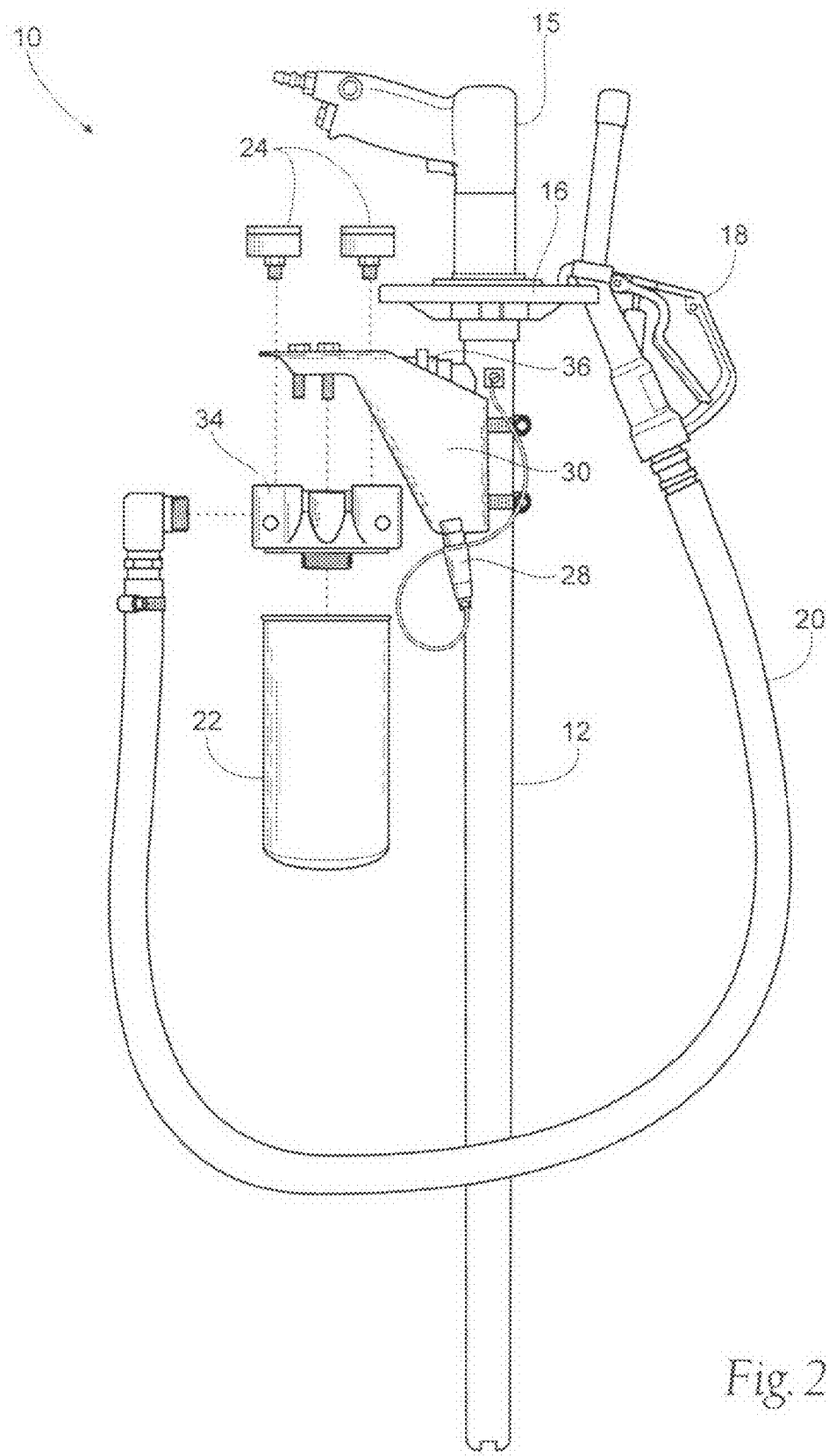
FIG. 2 is an exploded view of a lubricant filtration system of the present invention.

Referring now to FIG. 2, an exploded view of a lubricant filtration system 10 of the present invention is shown. Two pressure gauges 24 are provided at the upstream and downstream of filter unit 22. Preferably filter unit 22 is easily detachable to a filter head 34 so that changing filter units 22 after contamination can be easily accomplished.

Filter head 34 can receive threaded or other easily detachable couplings from both the adapter 36 coupled to the lubricant intake 12 at the upstream of filter unit 22, and the dispensing line 20 coupled to the dispensing unit 18.

Gauges 24 are provided at the upstream and downstream of filter unit 22 so that a pressure differential can be detected, indicating a deterioration of the filter unit 22, possibly necessitating a change of filter units 22 for filtration efficacy.

Figure 3:
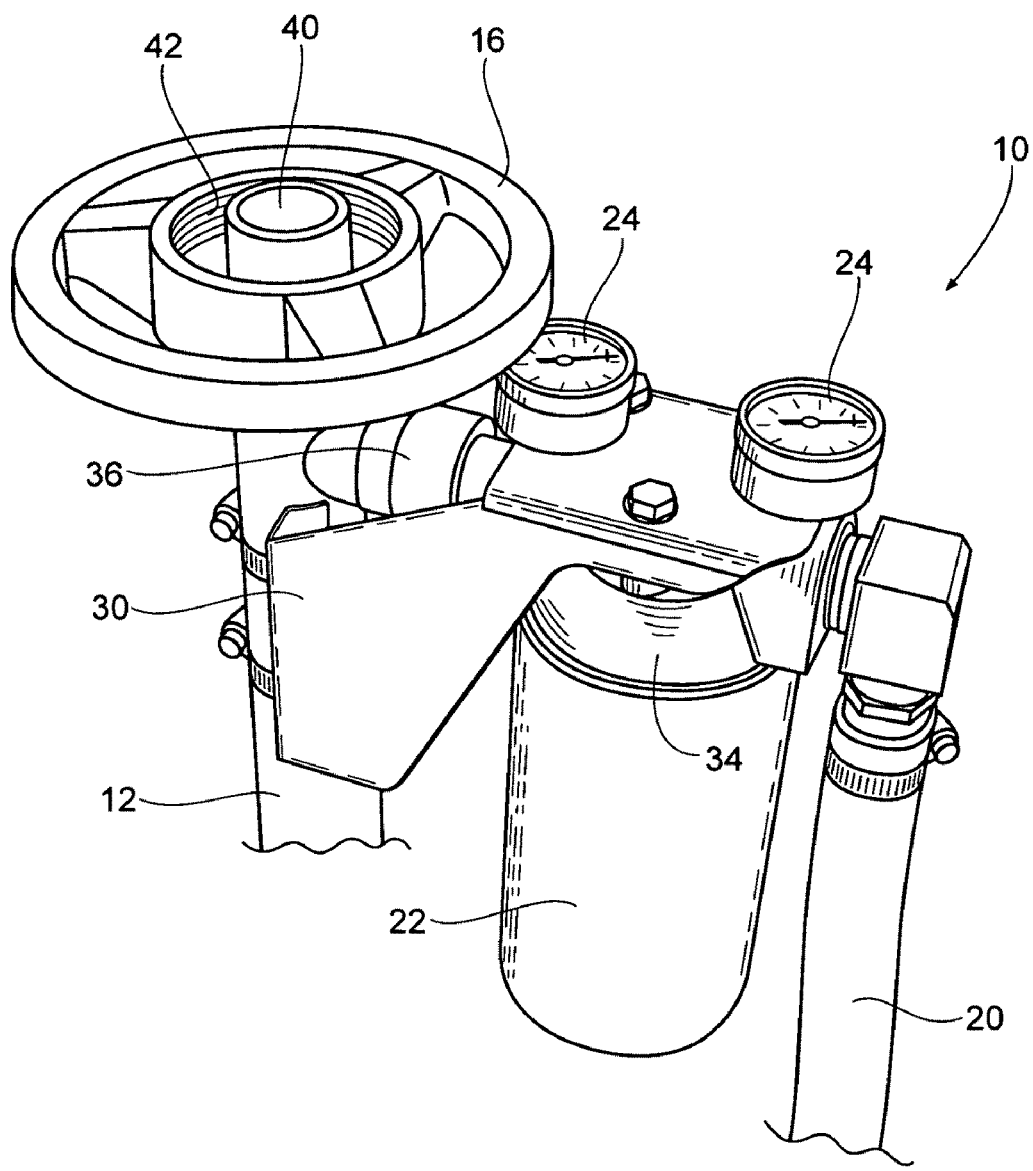
FIG. 3 is an overhead perspective view of components of a lubricant filtration system of the present invention.

Referring now to FIG. 3, an overhead perspective view of components of the lubricant filtration system 10 of the present invention is shown. Bracket 30 serves as a convenient port for carrying gauges 24 coupled through bracket 30 to filter head 34, which in turn is removably coupled to filter 22. Bracket 30 is coupled to lubricant intake 12, which in turn carries hand wheel 16. Hand wheel 16 is preferably provided with a threaded portion 42 for easily placing either electrical pump 14, a pneumatic unit 15, or any other type of pumping mechanism quickly and conveniently into communication through intake opening 40 through lubricant intake 12 into the drum 5 and associated lubricant.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:
1. A lubricant filtration system comprising:
   a lubricant intake configured for immersing in lubricant and coupling to a reservoir containing said lubricant;
   a hand wheel structure coupled to said lubricant intake;
   a pump for withdrawing said lubricant from said reservoir and transmitting said lubricant through said filtration system, said pump removably coupled to said hand wheel structure, and said pump selectively directing lubricant from said reservoir to a filter unit containing filter media;
   a bracket coupled to said lubricant intake;
   a filter head carried by said bracket and coupled to said lubricant intake, said filter head carrying a coupling for detachably carrying said filter unit containing said filter media;
   a pressure gauge for monitoring fluid pressure prior to lubricant entering said filter media, and a pressure gauge for monitoring fluid pressure after lubricant leaves said filter media;
   a discharge pipe coupled to said filter head; and
   a dispenser coupled to said discharge pipe, said dispenser for dispensing filtered lubricant.

* * * * *